United States Patent
Yang et al.

(10) Patent No.: US 10,299,272 B2
(45) Date of Patent: May 21, 2019

(54) SWITCHING CARRIER FREQUENCY WHILE USER EQUIPMENT IS IN OFF CYCLE

(71) Applicant: NOKIA SOLUTIONS AND NETWORKS OY, Espoo (FI)

(72) Inventors: Roy Yang, Buffalo Grove, IL (US); Ejaz Shah, Algonquin, IL (US); Alan Jette, Cary, IL (US); Kamil Bechta, Wroclaw (PL); Man Hung Ng, Swindon (GB)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/344,039

(22) Filed: Nov. 4, 2016

(65) Prior Publication Data

US 2018/0132240 A1  May 10, 2018

(51) Int. Cl.
  *H04W 72/04*   (2009.01)
  *H04W 76/28*   (2018.01)
  (Continued)

(52) U.S. Cl.
  CPC ....... *H04W 72/0453* (2013.01); *H04L 5/0005* (2013.01); *H04L 5/0044* (2013.01); *H04L 5/0091* (2013.01); *H04W 36/00* (2013.01); *H04W 40/005* (2013.01); *H04W 72/005* (2013.01); *H04W 72/042* (2013.01); *H04W 76/28* (2018.02)

(58) Field of Classification Search
  CPC ........... H04W 72/0453; H04W 40/005; H04W 72/005; H04W 72/042; H04W 76/048
  See application file for complete search history.

(56) References Cited

U.S. PATENT DOCUMENTS

| 7,079,568 B1* | 7/2006 | Boetzel | H04B 1/713 375/132 |
| 2004/0266440 A1* | 12/2004 | Fuchs | H04L 12/1836 455/445 |

(Continued)

OTHER PUBLICATIONS

"Motivation for new WI proposal: SCell enhancements for LTE", RP-161708, 3GPP TSG RAN Meeting #73, New Orleans, USA, Sep. 19-22, 2016.

(Continued)

*Primary Examiner* — Mehmood B. Khan
(74) *Attorney, Agent, or Firm* — Brake Hughes Bellermann LLP

(57) ABSTRACT

A method may include determining, by a base station, a switching occasion during which at least one connected user equipment will be in a connected off cycle and at least one idle user equipment will be in an idle off cycle, instructing the at least one connected user equipment and at least one idle user equipment to switch, during the switching occasion, from communicating with the base station via a source carrier frequency to communicating with the base station via a target carrier frequency, and switching, during the switching occasion, from communicating with the at least one connected user equipment and the at least one idle user equipment via the source carrier frequency to communicating with the at least one connected user equipment and the at least one idle user equipment via the target carrier frequency.

18 Claims, 8 Drawing Sheets

(51) Int. Cl.
*H04W 40/00* (2009.01)
*H04W 72/00* (2009.01)
*H04L 5/00* (2006.01)
*H04W 36/00* (2009.01)

(56) References Cited

U.S. PATENT DOCUMENTS

| | | | | |
|---|---|---|---|---|
| 2007/0042794 A1* | 2/2007 | Fischer | ............... | H04W 72/121 455/466 |
| 2007/0178840 A1* | 8/2007 | Deguchi | ............... | H04W 88/10 455/62 |
| 2007/0191019 A1* | 8/2007 | Fischer | ............... | H04W 72/005 455/452.2 |
| 2008/0207201 A1* | 8/2008 | Fischer | ................ | H04W 48/12 455/434 |
| 2008/0311926 A1* | 12/2008 | Fischer | ............... | H04W 72/005 455/452.1 |
| 2009/0046632 A1 | 2/2009 | Nanda et al. | | |
| 2009/0252076 A1 | 10/2009 | Song | | |
| 2010/0151869 A1* | 6/2010 | Fischer | ................ | H04W 72/02 455/450 |
| 2010/0177654 A1* | 7/2010 | Charbit | ................ | H04B 1/7087 370/252 |
| 2011/0044239 A1* | 2/2011 | Cai | .................... | H04W 72/042 370/328 |
| 2011/0044261 A1* | 2/2011 | Cai | ....................... | H04L 5/0053 370/329 |
| 2011/0222502 A1* | 9/2011 | Aminaka | ............... | H04W 16/10 370/329 |
| 2011/0300856 A1* | 12/2011 | Aminaka | .......... | H04W 72/1215 455/422.1 |
| 2012/0082100 A1* | 4/2012 | Ahmadi | ............. | H04W 72/1215 370/329 |
| 2014/0086208 A1* | 3/2014 | Murray | ............. | H04W 36/0072 370/331 |
| 2014/0349745 A1* | 11/2014 | Russo | ............... | H04W 72/0486 463/29 |
| 2014/0369242 A1 | 12/2014 | Ng et al. | | |
| 2015/0208411 A1* | 7/2015 | Mochizuki | ........ | H04W 72/1226 455/452.1 |
| 2015/0230141 A1 | 8/2015 | Zou et al. | | |
| 2016/0007247 A1* | 1/2016 | Lee | ................... | H04W 36/0066 370/331 |
| 2016/0330743 A1* | 11/2016 | Das | ........................ | H04W 76/10 |

OTHER PUBLICATIONS

"New WI proposal: SCell enhancements for LTE", RP-161707, 3GPP TSG RAN Meeting #73, New Orleans, Sep. 19-22, 2016.
Yi, SeungJune et al., "Radio Protocols for LTE and LTE-Advanced", 6 pages, 2012.
International Search Report and Written Opinion for International Application PCT/EP2017/077367, dated Jan. 11, 2018, 17 pages.
Huawei et al.; "L1 Indication for UE Support of Fast Carrier Selection"; R1-154326, 3GPP TSG RAN WG1 Meeting #82, Beijing, China; Aug. 24-28, 2015; 3 pages.

* cited by examiner

SWITCHING CARRIER FREQUENCY WHILE USER EQUIPMENT IS IN OFF CYCLE

TECHNICAL FIELD

This description relates to wireless networking.

BACKGROUND

Some spectral resources, such as carrier frequencies, may be licensed to users with different access priorities to the spectral resources. Some users may be allowed to use the spectral resources until a higher priority user claims the spectral resources, at which point the lower priority user must stop using the claimed spectral resources and may continue communicating on unclaimed spectral resources, if available.

For example, in the United States, the Federal Communications Commission (FCC) has opened 150 Megahertz (MHz) of shared spectrum at 3.5 Gigahertz (GHz) for lightly licensed, shared used as a "Citizens Broadband Radio Service" (CBRS). The method(s), function(s), and/or technique (s) described herein may also be applied to other frequency bands. The CBRS attempts to improve the use of increasingly scarce spectrum through sharing by different user groups. In CBRS the three groups include three tiers of users, ordered from the highest priority to the lowest priority: Incumbent Access, Priority Access License (PAL), and General Authorized Access (GAA). The FCC specifies that a Spectrum Access System (SAS) entity must protect the higher priority users from interference by the lower priority users (protecting Incumbent Access from interference by PAL and GAA, and protecting PAL from interference by GAA). A user, which may include a base station (such as an Enhanced Node B or eNB) serving user equipments, may be required to shift to a different carrier frequency when an Incumbent Access entity or a Priority Access License entity claims the carrier frequency that the base station is using to serve the user equipments, when the SAS entity decides that the base station needs to switch to a different carrier frequency by way of interference margin partitioning and redistribution, or when an existing traffic load changes and the SAS entity instructs two different base stations to swap carrier frequencies to improve interference margins. It may be difficult for the base station to switch carrier frequencies while continuing to serve the user equipments.

SUMMARY

According to an example, a method may include determining, by a base station, a switching occasion during which at least one connected user equipment will be in a connected off cycle and at least one idle user equipment will be in an idle off cycle, instructing the at least one connected user equipment and at least one idle user equipment to switch, during the switching occasion, from communicating with the base station via a source carrier frequency to communicating with the base station via a target carrier frequency, and switching, during the switching occasion, from communicating with the at least one connected user equipment and the at least one idle user equipment via the source carrier frequency to communicating with the at least one connected user equipment and the at least one idle user equipment via the target carrier frequency.

According to another example, a method may include communicating, by a user equipment, with a base station via a source carrier frequency, receiving a switch message from the base station, the switch message instructing the user equipment to switch from a source carrier frequency to a target carrier frequency during a switching occasion, the switch message identifying the target carrier frequency and the switching occasion, the switching occasion being a time period when the user equipment and other user equipments served by the base station are not required to monitor for a control signal, switching, during the switching occasion, from the source carrier frequency to the target carrier frequency, and communicating with the base station via the target carrier frequency.

A non-transitory computer-readable storage medium may include instructions stored thereon. When executed by at least one processor, the instructions may be configured to cause a base station to at least determine a switching occasion during which at least one connected user equipment will be in a connected off cycle and at least one idle user equipment will be in an idle off cycle, instruct the at least one connected user equipment and at least one idle user equipment to switch, during the switching occasion, from communicating with the base station via a source carrier frequency to communicating with the base station via a target carrier frequency, and switch, during the switching occasion, from communicating with the at least one connected user equipment and the at least one idle user equipment via the source carrier frequency to communicating with the at least one connected user equipment and the at least one idle user equipment via the target carrier frequency.

A non-transitory computer-readable storage medium may include instructions stored thereon. When executed by at least one processor, the instructions may be configured to cause a user equipment to at least communicate with a base station via a source carrier frequency, receive a switch message from the base station, the switch message instructing the user equipment to switch from a source carrier frequency to a target carrier frequency during a switching occasion, the switch message identifying the target carrier frequency and the switching occasion, the switching occasion being a time period when the user equipment and other user equipments served by the base station are not required to monitor for a control signal, switch, during the switching occasion, from the source carrier frequency to the target carrier frequency, and communicate with the base station via the target carrier frequency.

A base station may include at least one processor and a memory. The memory may comprise instructions stored thereon that, when executed by at least one processor, are configured to cause the base station to at least determine a switching occasion during which at least one connected user equipment will be in a connected off cycle and at least one idle user equipment will be in an idle off cycle, instruct the at least one connected user equipment and at least one idle user equipment to switch, during the switching occasion, from communicating with the base station via a source carrier frequency to communicating with the base station via a target carrier frequency, and switch, during the switching occasion, from communicating with the at least one connected user equipment and the at least one idle user equipment via the source carrier frequency to communicating with the at least one connected user equipment and the at least one idle user equipment via the target carrier frequency.

A user equipment may include at least one processor and a memory. The memory may include instructions stored thereon that, when executed by at least one processor, are configured to cause the user equipment to at least communicate with a base station via a source carrier frequency, receive a switch message from the base station, the switch message instructing the user equipment to switch from a source carrier frequency to a target carrier frequency during a switching occasion, the switch message identifying the target carrier frequency and the switching occasion, the switching occasion being a time period when the user equipment and other user equipments served by the base station are not required to monitor for a control signal, switch, during the switching occasion, from the source carrier frequency to the target carrier frequency, and communicate with the base station via the target carrier frequency.

The details of one or more implementations are set forth in the accompanying drawings and the description below. Other features will be apparent from the description and drawings, and from the claims.

DETAILED DESCRIPTION

To enable switching of spectral resources such as carrier frequency without interrupting communications, entities such as a base station and user equipments may switch at a switching occasion when the user equipments are scheduled to be inactive, which may be considered an off cycle and/or when no uplink or downlink communications from or to the user equipments are scheduled to occur. The base station may determine the switching occasion as a time during which at least one connected user equipment will be inactive and/or in an off cycle or off duration and at least one idle user equipment will be inactive and/or in an off cycle, and/or when all user equipments served by the base station will be inactive and/or in off cycles or off durations. The switching occasion may, for example, occur during a subframe in which both the connected user equipment(s) and idle user equipment are in an off-cycle, and/or are not required to monitor for a control signal such as a Physical Downlink Control Channel (PDCCH) signal, during a Discontinuous Reception (DRX) process. The base station may instruct the user equipments to switch, during the switching occasion, from communicating with the base station via the source carrier frequency to communicating with the base station via a target carrier frequency.

The base station and user equipments may be synchronized and switch at a same time, during the switching occasion, from communicating with each other via the source carrier frequency to communicating with each other via the target carrier frequency. The base station and user equipments may also tune their respective radio frequencies to the target carrier frequency during the switching occasion. When the user equipments enter an on cycle after the switching, the base station and user equipments may start communication via the target carrier frequency. Radio resources and user states, other than the spectral resource and/or carrier frequencies, may remain the same and/or remain unchanged after the switch. The base station and user equipments may not have been communicating with each other via the target carrier frequency before the switch. The base station and user equipments may not communicate with each other via the source carrier frequency after the switch. As described herein, a carrier frequency may include a frequency onto which signals are modulated, a group of frequencies onto which signals are modulated, or a range or ranges of frequencies onto which signals are modulated.

Figure 1:
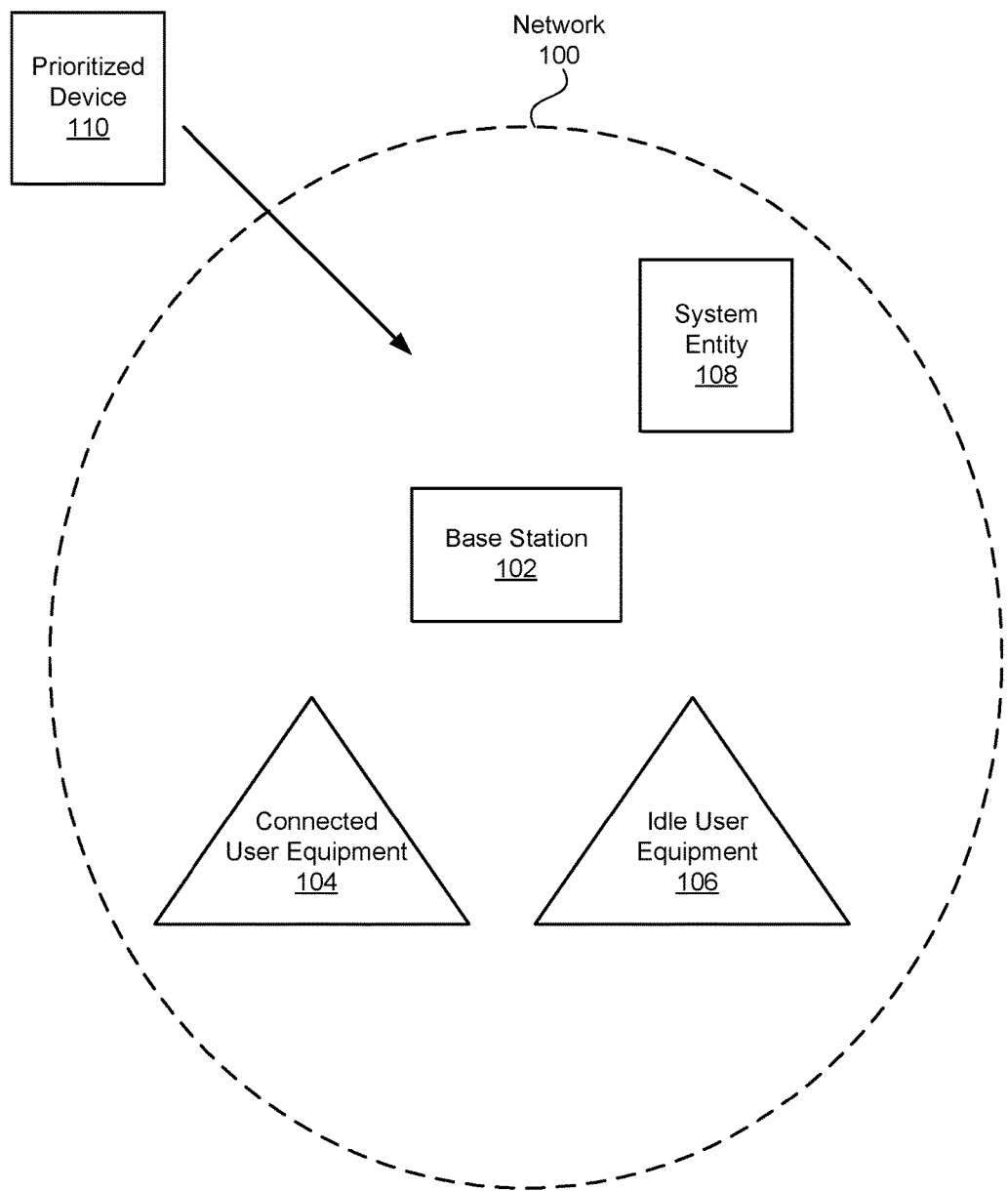
FIG. 1 is a diagram of a network according to an example implementation.

FIG. 1 is a diagram of a network 100 according to an example embodiment. The network 100 may include a wireless infrastructure network with multiple nodes communicating with a central node in accordance with instructions received from the central node, such as a Long-Term Evolution (LTE) or Long-Term Evolution Advanced (LTE-Advanced) network, a Global Packet Radio Service (GPRS) network, a Global System for Mobile Communications (GSM) network, or a Universal Mobile Telecommunications System (UMTS) network, as non-limiting examples.

The network 100 may include a base station 102 serving user equipments 104, 106. The base station 102 may include an Enhanced Node B and/or an access point (AP). The base station 102 may instruct the user equipments 104, 106 when to send uplink messages and receive downlink messages and at what frequency to send and receive messages. The base station 102 may instruct the user equipments 104, 106 when to send uplink messages and receive downlink messages, and at what frequency to send and receive messages, via a Physical Downlink Control Channel (PDCCH), for example. The base station 102 may route messages and/or data between the user equipments 104, 106 and other user equipments in other networks and/or remote servers via a backhaul network and/or other base stations.

The user equipments 104, 106 may include devices configured to communicate with the base station 102 such as mobile phones, smartphones, personal digital assistants (PDAs), tablet computers, laptop or notebook computers, or satellite hotspots, as non-limiting examples. The connected user equipment 104 may include a user equipment that is actively communicating with the base station 102, and/or a user equipment to which the base station 102 has assigned spectral resources such as time slots or frames and subframes to send and/or receive messages and/or data. The idle user equipment 106 may include a user equipment that is not actively communicating with the base station 102 (such as not sending and/or receiving data other than control signals), and/or a user equipment to which the base station 102 has not assigned spectral resources such as time slots or frames and subframes to send and/or received messages and/or data and/or to which the base station 102 has assigned only a control channel for assigning spectral resources such as a PDCCH. The idle user equipment may enter a sleep mode, which may include off cycles and/or off durations, and wake and/or enter an on cycle and/or on duration only to check the control channel. The base station 102 may have also assigned a PDCCH to the connected user equipment 104.

In an example implementation, the base station 102 may apply a timer, such as a radio resource control (RRC) inactivity timer, to track activity of the user equipments 104, 106. The timer may be set to a predetermined duration, such as thirty seconds. A user equipment 104, 106 may enter an idle state, and/or become an idle user equipment 106, if the timer expires and the user equipment 106 did not receive or send any data during the time between when the timer started and when the timer expired. A user equipment will become a connected user equipment 106 if data is destined and/or addressed to the user equipment 106. Upon a connected user equipment 106 receiving data, the timer associated with the user equipment 106 may be reset. While FIG. 1 shows only a single connected user equipment 104 and a single idle user equipment 106 for illustrative purposes, many more connected user equipments and idle user equipments may be in the network 100 communicating with the base station 102 and performing functions described herein with respect to the connected user equipment 104 and idle user equipment 106.

To extend battery time, the user equipments 104, 106 may alternate between on cycles or on durations and off cycles or off durations. During a cycle, such as a discontinuous reception (DRX) cycle, for a connected user equipment 104, which may include multiple on cycles or on durations and multiple off cycles or on durations, the connected user equipment 104 may monitor for signals including control signals (such as PDCCH messages), and may not monitor for signals during off cycles. During a cycle, such as a DRX cycle, for an idle user equipment 106, which may include on a single on cycle or on duration and multiple off cycles or off durations, the idle user equipment 106 may monitor only for a control signal (such as a PDCCH message) during the on cycle or on duration, and may not monitor for signals during off cycles.

A system entity 108, such as a Spectrum Access System (SAS) entity, may enforce rules regarding access to spectral resources such as carrier frequencies. The system entity 108 may ensure that higher priority users have priority to the spectral resources over lower priority users, and may require lower priority users to give up spectral resources needed by higher priority users. The system entity 108 may be controlled and/or operated by a same entity that controls and/or operates the base station 102, or by a third party.

In the example shown in FIG. 1, a prioritized device 110 may become active in the network 100 and/or claim spectral resources such as a carrier frequency within the network 100. The prioritized device 110 may include an Incumbent, such as a military entity such as a naval ship, military radar system, or fixed satellite service earth station (FSS) coming online in an example in which the base station 102 is a PAL user who gained access to the spectral resources with some degree of exclusive right of usage such as a mobile operators, or a GAA user which accesses the spectral resources without exclusivity. In an example in which the base station 102 is a GAA user which accesses the spectral resources without exclusivity such as an information technology department of a college campus, the prioritized device 110 may be a PAL base station. The system entity 108 may respond to the prioritized device 110 becoming active in the network 100 and/or claiming the spectral resources by instructing the base station 102, which has a lower priority than the prioritized device 110, to cease using the spectral resources claimed by the prioritized device 110 and/or switch to using a different spectral resource and/or carrier frequency. The base station 102 may be required to switch from the source carrier frequency to the target carrier frequency within a predetermined time, such as 300 seconds, of when the prioritized device 110 starts operation in the network 110 and/or claims spectral resources such as a carrier frequency within the network 110. Multiple radio access technologies, such as LTE, LTE-A, GPRS, GSM, and/or UMTS, and numerous large and small operators, may share the spectral resources in the network 100, so that a standard method of switching from the source carrier frequency to the target carrier frequency, such as the method(s), function(s), and/or technique(s) described herein, may be helpful to facilitate the spectral resource sharing and co-existence within network 110.

Figure 2:
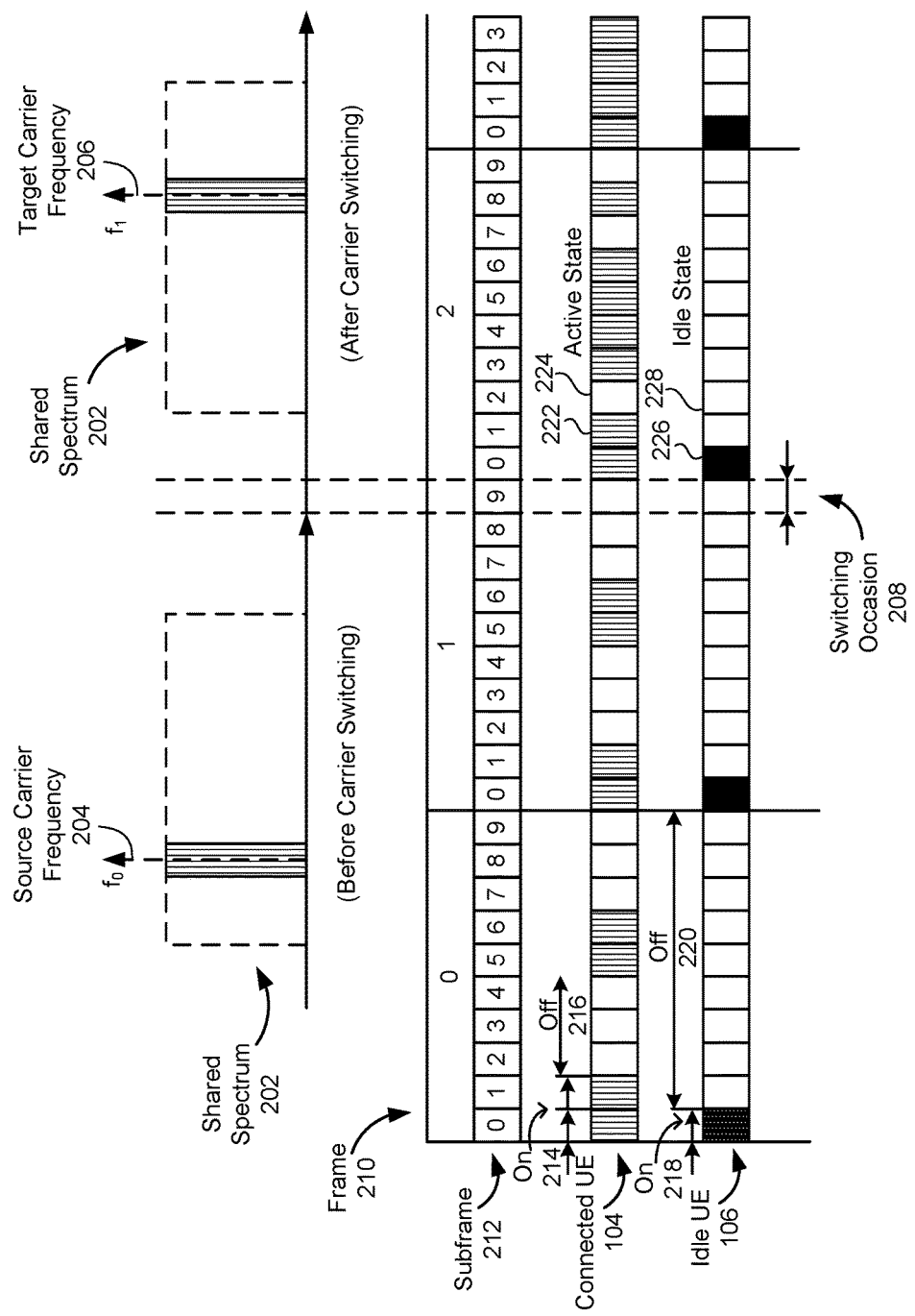
FIG. 2 shows frames and subframes during which a base station may switch carrier frequencies used to serve user equipments according to an example implementation.

FIG. 2 shows frames 210 and subframes 212 during which the base station 102 may switch carrier frequencies used to serve user equipments 104, 106 according to an example embodiment. The subframes may each have a time period of one millisecond (1 ms). The frames may each have a time duration of ten milliseconds (10 ms). As discussed, above, the base station 102 may determine a switching occasion for switching from the source carrier frequency to the target carrier frequency. The switching occasion may be a time duration, such as a subframe, during which none of the user equipments 104, 106 are in an active state, on cycle, or on duration, all of the user equipments 104, 106 are in an off-cycle or off duration (such as an off cycle or off duration of one or more DRX processes), and/or all of the user equipments 104, 106 are not required to monitor for control signals. An off cycle or off duration for a connected user equipment 104 may be considered a connected off cycle or connected off duration, and an on cycle or on duration for a connected user equipment 104 may be considered a connected on cycle or connected on duration. An off cycle or off duration for an idle user equipment 106 may be considered idle off cycle or idle off duration, and an on cycle or on duration for an idle user equipment 106 may be considered an idle on cycle or idle on duration.

As shown in FIG. 2, to the left of, and/or before, the switching occasion 208, from frame 0, subframe 0 to frame 1, subframe 8, the base station 102 and user equipments 104, 106 are communicating with each other via a source frequency, denoted $f_0$ 204, within a shared spectrum 202 available within the network 100. The base station 102 may determine the switching occasion 208, which in this example is frame 1, subframe 9, when no communications with the user equipments 104, 106 are scheduled and/or the user equipments 104, 106 are not required to monitor for downlink transmissions.

In the example shown in FIG. 2, the connected user equipment 104 may be in an on cycle and/or on duration, monitoring for downlink communication from the base station 102, for two subframes 212 (0,1, 5, and 6) within each frame 210 before going into an off cycle and/or off duration, before the switching occasion 208. Also in this example, the connected user equipment 104 may be in an off cycle and/or off duration, not required to monitor for downlink communication (and thereby saving power), for three subframes 212 (2, 3, 4, 7, 8, 9) before going back into the on cycle and/or on duration. The shaded boxes indicate subframes that are on durations or on cycles when the base station 102 has scheduled communication with the respective user equipment 104, 106 and/or the user equipment 104, 106 is required to monitor for downlink transmissions. The unshaded boxes indicate subframes off durations or on cycles when the base station 102 has not scheduled communications with the respective user equipments 104, 106 and/or the respective user equipment 104, 106 is not required to monitor for downlink transmissions. The idle user equipment 106 may be in an on cycle and/or on duration, monitoring for a downlink communication from the base station 102 such as a control signal, for only one subframe 212 (0) within each frame 210 before going into an inactive cycle and/or off cycle or off duration, before the switching occasion 208. The base station 102 may determine a common subframe during which all of the connected user equipments 104 and idle user equipments 106 are in off cycles and/or off durations, in this example frame 1, subframe 9, and assign the subframe during which all of the connected user equipments 104 and idle user equipments 106 are in off cycles and/or off durations as the switching occasion 208. The common subframe selected as the switching occasion 208 may have been an inactive cycle and/or off duration for all of the user equipments 104, 106 based on assignments made by the base station 102 before the determination was made to switch carrier frequencies, or the base station 102 may, in response to a determination that the carrier frequency should be switched, reassign on cycles or on durations and off cycles or off durations to the user equipments 104, 106 in such a manner to ensure that there is at least one common subframe 212 during which all of the user equipments 104, 106 are in off cycles or off durations, so that the common subframe 212 may be selected as the switching occasion 208 and/or determined to be the switching occasion 208.

During the switching occasion 208, the base station 102 and user equipments 104, 106 may switch from communicating with each other via the source frequency $f_0$ 204 within the shared spectrum 202 to communicating with each other via the target frequency $f_1$ 206 within the shared spectrum 202. During the switching occasion 208, the base station 102 and user equipments 104, 106 may tune to the radio frequency at the target frequency $f_1$ 206. Before the switching occasion 208, the base station 102 and user equipments 104, 106 may not have communicated with each other via the target frequency $f_1$ 206. After the switching occasion 208, the base station 102 and user equipments 104, 106 may not communicate with each other, and/or may cease communicating with each other, via the source frequency $f_0$ 204. The source frequency $f_0$ 204 may be non-overlapping with the target frequency $f_1$ 206.

After the switching occasion 208, the assignment of active or on subframes 212 and inactive or off subframes may be different than before the switching occasion 208. In the example shown in FIG. 2, after the switching occasion 208, the connected user equipment 104 may have, in frame 2 210, seven on cycle or on duration subframes 212 (0, 1, 3, 4, 5, 6, and 8) and three off cycle or off duration subframes 212 (2, 7, and 9).

Figure 3:
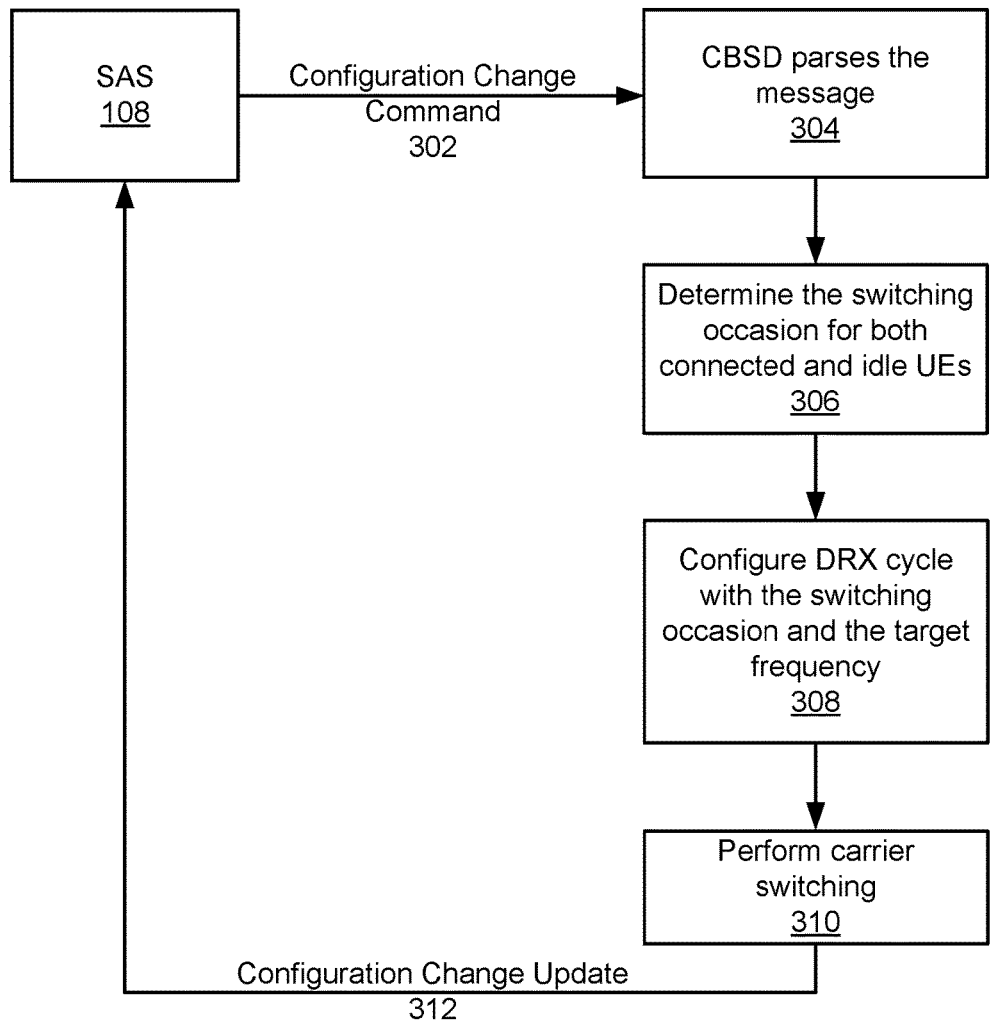
FIG. 3 is a flowchart showing a message flow between a Spectrum Access System (SAS) entity and a Citizens Broadband Radio Service (CBRS) entity according to an example implementation.

FIG. 3 is a flowchart showing a message flow between a Spectrum Access System (SAS) entity such as the system entity 108 and a Citizens Broadband Radio Service (CBRS) entity such as the base station 102 according to an example embodiment. The system entity 108 may be responsible for determining, and providing to the base stations 102 (which may be CBSDs), available channels and/or frequencies within their respective networks 100, retaining information about, and enforcing, exclusion zones to protect Incumbents and/or higher priority users (such as fixed satellite service earth station (FSS)), and/or protecting PAL users from interference from GAA users. The system entity 108 may also trigger frequency reallocation between GAA users to mitigate frequency interference.

The system entity 108 may send a configuration change command 302 to the base station 102 and/or CBSD entity in response to receiving a heartbeat request message from the base station 102 and/or CBSD entity. The base station 102 and/or CBSD entity may maintain a heartbeat interval timer, and upon expiration of the heartbeat interval timer, the base station 102 and/or CBSD entity may send the heartbeat request message to the system entity 108. The exchange of heartbeat request messages and heartbeat response messages may be periodic, such as every sixty seconds.

The system entity 108 may respond to the heartbeat request message by sending a heartbeat response message to the base station 102 and/or CBSD entity. The heartbeat response message may include the configuration change command 302. The system entity 108 may have stored and/or previously determined the source carrier frequency via which the base station 102 and/or CBSD is communicating when the system entity 108 sends the configuration change command 302 to the base station 102 and/or CBSD. The configuration change command 302 may instruct the base station 102 and/or CBSD to switch to a different carrier frequency, such as the target carrier frequency. The configuration change command 302 may include the target carrier frequency to which the base station 102 and/or CBSD should switch, may include a list of carrier frequencies that are occupied and/or not available so that the base station 102 and/or CBSD may switch to a carrier frequency that is not on the list, and/or may simply instruct the base station 102 and/or CBSD to switch to a carrier frequency other than the source carrier frequency.

The base station 102 and/or CBSD may parse the configuration change command 302 message (304). The parsing the configuration change command 302 message (304) may include determining whether the configuration change command 302 message includes an instruction to switch carrier frequencies. The configuration change command 302 could also report interference within specified frequencies, based on which report the base station 102 and/or CBSD may select a target carrier frequency other than the frequency(ies) with reported interference.

If the base station 102 and/or CBSD determines that the configuration change command 302 does include an instruction to switch carrier frequencies, then the base station 102 and/or CBSD may determine a switching occasion 208 (306). The switching occasion 208 may be a time to switch from the source carrier frequency to the target carrier frequency, and/or to tune the radio frequency to the target radio frequency. The determining the switching occasion 208 (306) may include determining a time duration in which all of the active user equipments 104 and idle user equipments served by the base station 102 and/or CBSD are in an off cycle and/or off duration, are inactive, and/or are not required to monitor for control signals or downlink transmissions from the base station 102 and/or CBSD. The switching occasion 208 may be a full subframe 212, or less than a subframe in duration and/or less than one millisecond in duration.

In an example embodiment, after determining the switching occasion 208 (306), the base station 102 and/or CBSD may configure a Discontinuous Reception (DRX) cycle with the switching occasion 208 and the target frequency (308). The configuring (308) may ensure a common off time for the switching occasion 208. The configuring (308) may include sending the switching occasion 208, which may be specified as a specific time such as a frame number and subframe number or a time delay after a current time such as a number of frames and/or subframes later, to the user equipments 104, 106. The configuring (308) may also include sending the target frequency to the user equipments 104, 106.

After the configuring (308), the base station 102 and/or CBSD and user equipments 104, 106 may perform the carrier switching (310). The carrier switching (310) may include the base station 102 and/or CBSD and user equipments 104, 106 tuning to the radio frequency of the target carrier frequency and/or switching to the new carrier frequency. At a next on cycle and/or on duration, and/or active frame or subframe after the switching occasion 208, the base station 102 and/or CBSD may serve and/or communicate with the user equipments 104, 106 via the target frequency. The base station 102 and/or CBSD may also send a configuration change update message 312 to the system entity 108. The configuration change update message 312 may be included in a heartbeat request message that the base station 102 and/or CBSD sends to the system entity 108. The configuration change update message 312 may identify the target carrier frequency, the status of the carrier frequency switch, the user equipments 104, 106 served by the base station 102 and/or CBSD via the target carrier frequency, the connected or idle status of the user equipments 104, 106 served by the base station 102 and/or CBSD via the target carrier frequency, and/or the off cycles or off durations and on cycles or on durations, or idle and active cycles or subframes of the user equipments 104, 106 served by the base station 102.

Figure 4:
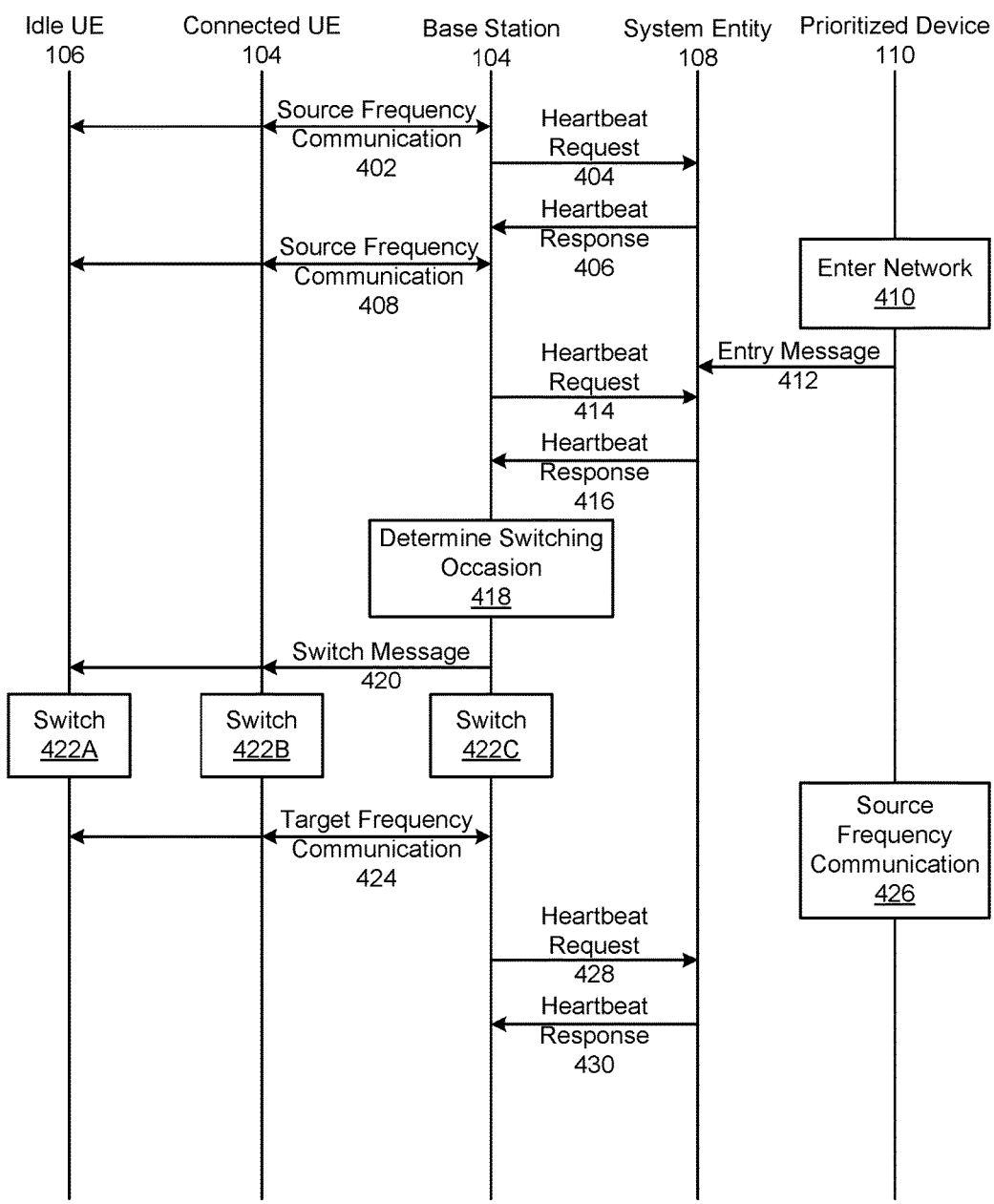
FIG. 4 is a timing diagram showing actions performed by the entities in the network shown in FIG. 1 according to an example implementation.

FIG. 4 is a timing diagram showing actions performed by the entities in the network 100 shown in FIG. 1 according to an example embodiment. The base station 102 and user equipments 104, 106 may communicate with each other via the source carrier frequency (402). While the base station 102 and user equipments 104, 106 are communicating with each other via the source carrier frequency, the base station 102 may send a heartbeat request (404) to the system entity 108. The heartbeat request (404) may inform the system entity 108 that the base station 102 and user equipments 104, 106 served by the base station 102 are active and/or are communicating via the source carrier frequency. The system entity 108 may respond to the heartbeat request (404) by sending a heartbeat response (406) to the base station 102. The heartbeat response (406) may indicate that the source carrier frequency is still available and the base station 102 and user equipments 104, 106 may continue to communicate via the source carrier frequency. The base station 102 may parse the heartbeat response (406), as discussed above with respect to (304). In parsing the heartbeat response (406), the base station 102 may determine, based on the parsing, that the heartbeat response (406) does not include any frequency carrier switching content, and continue communicating with the user equipments 104, 106 via the source carrier frequency.

While the base station 102 and user equipments 104, 106 are communicating via the source carrier frequency, the prioritized device 110 may become active in network 100 (410). The prioritized device 110 may be activated in the network 100 (410) by using or requesting to use the source carrier frequency used by the devices including the base station 102 and user equipments 104, 106 in the network 100. Upon activation, the prioritized device 110 may send an entry message (412) to the system entity 108. The system entity 108 may also be notified of the presence of prioritized device 110 in network 100 by an incumbent monitoring entity which monitors and/or detects presence of activity by incumbent entity(ies), which may obviate the need for the prioritized device 110 to send the entry message 412. The entry message (412) may indicate that the prioritized device 110 is requesting and/or claiming the source carrier frequency and/or spectral resources via which the devices including the base station 102 and user equipments 104, 106 in the network 100 are communicating. Based on receiving the entry message (412) and/or the incumbent monitoring entity detecting the activity by the prioritized device 110 and/or incumbent entity, the system entity 108 may inform the base station 102, in response to a next heartbeat request (414), that the base station 102 must vacate, and/or stop communicating via, the source carrier frequency.

After the system entity 108 received the entry message (412) from the prioritized device 110, the base station 102 may send a heartbeat request (414) to the system entity 108. The heartbeat request (414) may have been previously scheduled by the base station 102, and/or the base station 102 may send the heartbeat request (414) to the system entity 108 without knowledge of the prioritized device 110 entering the network (410) or sending the entry message (412) to the system entity 108. The heartbeat request (414) may be similar to the heartbeat request (404), and may inform the system entity 108 of the base station's 102 use of the source carrier frequency.

In response to receiving the heartbeat request (414) indicating the base station's 102 use of the source carrier frequency, and based on receiving the entry message (412) indicating that the prioritized device 110 is requesting and/or claiming the source carrier frequency, the system entity 108 may send the base station 102 a heartbeat response (416) instructing the base station 102 to vacate and/or stop communicating via the source carrier frequency. The base station 102 may parse the heartbeat response (416) as discussed above with respect to (304). The base station 102 may, based on the parsing, determine that the heartbeat response (416) includes an instruction to switch carrier frequencies. Based on, and/or in response to, receiving the heartbeat response (416) instructing the base station 102 to vacate and/or stop communicating via the source carrier frequency, the base station 102 may determine a switching occasion (418). The base station 102 may determine a switching occasion (418) as a time period and/or time duration during which all of the user equipments 104, 106 are in off cycles and/or off durations, and/or during which none of the user equipments 104, 106 is required to monitor for control messages, as described above. The switching occasion 218 may be set to be at least as long as a maximum time for the base station 102 and/or user equipments 104, 106 to perform radio frequency tuning to the target carrier frequency. Determining the switching occasion (418) may also include determining the target carrier frequency to switch to.

After determining the switching occasion (418), the base station 102 may send a switch message (420) to the user equipments 104, 106. The switch message 420 may be included in a SystemInformationBlock message, and/or in a paging message for the idle user equipment 106 with a systemInfoModification field enabled indicating that the idle user equipment 106 should wake up and/or turn on to receive the switch message (420). The paging message may be included in a Physical Downlink Control Channel (PDCCH) message. The switch message (420) may instruct the user equipments 104, 106 to switch from communicating with the base station 102 via the source carrier frequency to communicating with the base station 102 via a target carrier frequency at the switching occasion 208. The switch message (420) may identify the target carrier frequency via which the user equipments 104, 106 should communicate with the base station 102 after the switch. The switch message 420 may identify the switching occasion in an absolute time format, such as by a frame number and a subframe number or a frame number, subframe number, slot number, and symbol number, or by a relative time format, such as a number of subframes from a current subframe. The base station 102 may send the switch message (420) to all of the user equipments 104, 106 as a broadcast switch message 420A, shown and described with respect to FIG. 5A, or may send the switch message (420) to each of the user equipments 104, 106 individually as unicast switch messages 420B, shown and described with respect to FIG. 5B.

After the base station 102 sends the switch message (420) to the user equipments 104, 106, and the user equipments 104, 106 have received, processed, and/or recognized the switch message (420), the connected user equipment 104 may enter a discontinuous reception (DRX) mode in which the connected user equipment 104 does not monitor for control signals, and/or any downlink signals, during predetermined time periods including the switching occasion 208. The base station 102 and user equipments 104, 106 may switch (422A, 422B, 422C) from communicating via the source carrier frequency to communicating via the target carrier frequency. The switching (422A, 422B, 422C) by the base station 102 and the user equipments 104, 106 may include tuning to the radio frequency of the respective base station 102 and user equipments 104, 106 to the frequency of the carrier frequency.

After switching (422A, 422B, 422C), the base station 102 and user equipments 104, 106 may communicate with each other via the target carrier frequency (424). While the base station 102 and user equipments 104, 106 are communicating with each other via the target carrier frequency (424), the prioritized device 110 may communicate with devices served by, and/or in communication with, the prioritized device 110, and/or devices other than the devices (including the user equipments 104, 106) served by the base station 102, via the source frequency (426).

After the switch (422A, 422B, 422C), the base station 102 and user equipments 104, 106 may maintain existing user states and resource allocation. The simultaneous switching of the carrier frequency for all of the user equipments 104, 106 in a short time period may maintain near constant pathloss values between the base station 102 and user equipments 104, 106, minimizing impact on uplink synchronization for active users. The simultaneous switching within a short time period after receiving the instruction from the system entity 108, enables the base station 102 to comply with regulatory requirements requiring the base station 102 and user equipments 104, 106 to stop communicating via the source frequency within a predetermined time (such as three hundred seconds) after receiving the instruction from the system entity 108. Hybrid Automatic Repeat reQuest (HARQ) may not be impacted by the switching (422A, 422B, 422C).

The base station 102 may continue to send heartbeat requests (428) to the system entity 108 indicating that the base station 102 is serving and/or communicating with the user equipments 104, 106 via the target frequency. The system entity 108 may respond to the heartbeat requests (428) by sending heartbeat responses (430) to the base station 102. The heartbeat responses (430) may indicate that the base station 102 may continue to serve and/or communicate with the user equipments 104, 106 via the target carrier frequency until another prioritized device claims and/or requests the target carrier frequency.

The base station 102 may parse the heartbeat response (430), as discussed above with respect to (304). In parsing the heartbeat response (430), the base station 102 may determine, based on the parsing, that the heartbeat response (430) does not include any frequency carrier switching content, and continue communicating with the user equipments 104, 106 via the target carrier frequency.

Figure 5A:
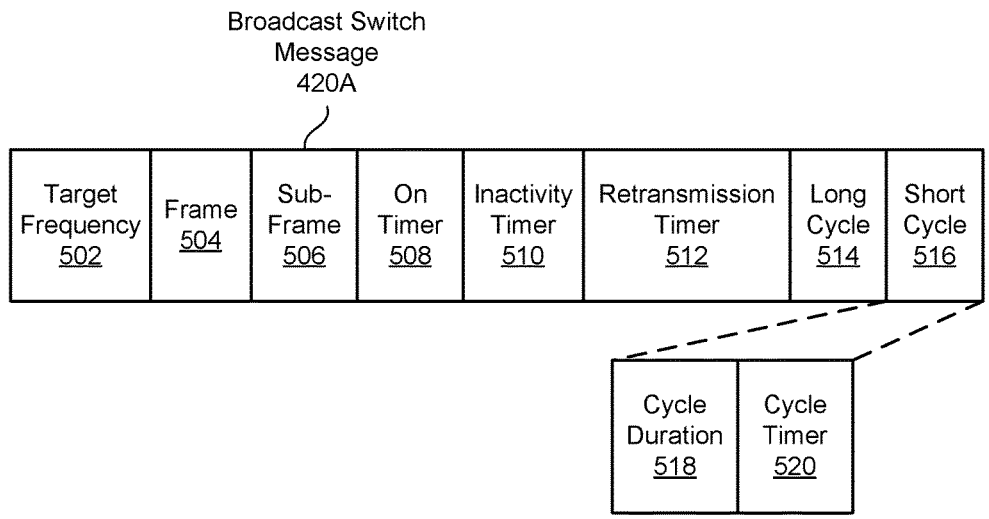
FIG. 5A is a diagram of a broadcast switch message according to an example implementation.

FIG. 5A is a diagram of a broadcast switch message 420A according to an example embodiment. The broadcast switch message 420A is an example of a switch message (420) that the base station 102 may send and/or broadcast to all of the user equipments 104, 106 served by the base station 102.

The broadcast switch message 420A may include a target frequency field 502. The target frequency field 502 may identify the target carrier frequency to which the base station 102 and user equipments 104, 106 should switch.

The broadcast switch message 420A may include a frame field 504. The frame field 504 may identify a frame number of the switching occasion 208. The broadcast switch message 420A may include a subframe field 506. The subframe field 506 may identify a subframe number, within the frame identified by the frame field 504, for the switching occasion 208.

The broadcast switch message 420A may include an on timer field 508. The on timer field 508 may indicate the frames 210 during which the user equipments 104, 106 should be on and/or monitoring for downlink transmissions from the base station 102. The broadcast switch message 420A may include an inactivity timer 510. The inactivity timer 510 may indicate how long the user equipments 104, 106 should wait until going to sleep, becoming idle, and/or becoming inactive (such as by entering an off cycle or off duration). The inactivity timer 510 may be set to delay a connected user equipment 104 from going to sleep, becoming idle, and/or becoming idle until just before (such as one subframe before or during) the switching occasion 208, to minimize the downtime during which the connected user equipment 104 is not receiving and/or sending data. The broadcast switch message 420A may include a retransmission timer field 512. The retransmission timer field 512 may indicate how long the user equipments 104, 106 should wait for an acknowledgment of a message, packet, or data sent by the user equipment 104, 106 to the base station 102 before retransmitting the message, packet, or data to the base station 102.

The broadcast switch message 420A may include a long cycle field 514. The long cycle field 514 may indicate how long the user equipments 104, 106 should remain on or off, and/or how long the user equipments 104, 106 should remain in sleep mode (which may include off cycles and/or off durations). The broadcast switch message 420A may include a short cycle field 516. The short cycle field 516 may include a cycle duration subfield 518. The cycle duration subfield 518 may indicate how long a cycle of on and off periods should last. The short cycle field 516 may include a cycle timer subfield 520. The cycle timer subfield 520 may indicate how many times the cycles indicated by the cycle duration subfield 518 should be repeated before the user equipment 104, 106 enters a long cycle.

Figure 5B:
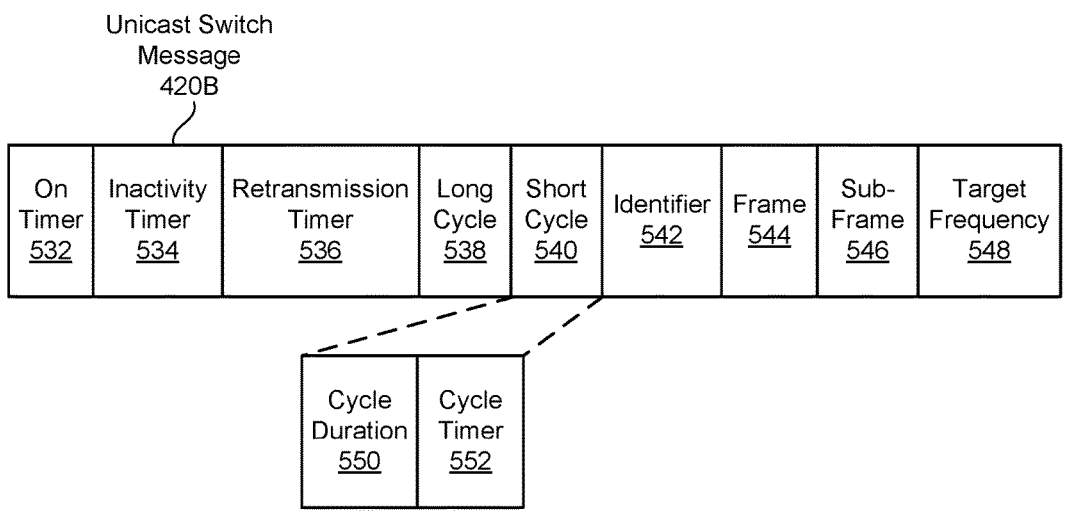
FIG. 5B is a diagram of a unicast switch message according to an example implementation.

FIG. 5B is a diagram of a unicast switch message 420B according to an example embodiment. The base station 102 may send individual unicast switch messages 420B to each user equipment 104, 106. A unicast switch message 420B sent to a connected user equipment 104 may be considered a unicast connected switch message. A unicast switch message 420B sent to an idle user equipment 106 may be considered a unicast idle switch message.

The unicast switch message 420B may include an on timer field 532. The on timer field 532 indicate the frames 210 during which the user equipment 104, 106 should be on and/or monitoring for downlink transmissions from the base station 102. The unicast switch message 420B may include an inactivity timer 534. The inactivity timer 534 may indicate how long the user equipment 104, 106 should wait until going to sleep, going into an off cycle and/or off duration, and/or becoming inactive. The unicast switch message 420B may include a retransmission timer field 536. The retransmission timer field 536 may indicate how long the user equipment 104, 106 should wait for an acknowledgment of a message, packet, or data sent by the user equipment 104, 106 to the base station 102 before retransmitting the message, packet, or data to the base station 102.

The unicast switch message 420B may include a long cycle field 538. The long cycle field 538 may indicate how long the user equipment 104, 106 should remain in sleep mode. The unicast switch message 420B may include a short cycle field 540. The short cycle field 540 may include a cycle duration subfield 550. The cycle duration subfield 550 may indicate how long a cycle of on and off periods should last. The short cycle field 540 may include a cycle timer subfield 552. The cycle timer subfield 552 may indicate how many times the cycles indicated by the cycle duration subfield 550 should be repeated, such as a number of short cycles or a multiple of the short cycle duration, before the user equipment 104, 106 enters a long cycle.

The unicast switch message 420B may include an identifier field 542 and/or an enable field. The identifier field 542 and/or enable field may identify the unicast switch message 420B as a switching message. The unicast switch message 420B may include a frame field 544. The frame field 544 may identify a frame number of the switching occasion 208. The unicast switch message 420B may include a subframe field 546. The subframe field 546 may identify a subframe number, within the frame identified by the frame field 544, for the switching occasion 208.

The unicast switch message 420B may include a target frequency field 548. The target frequency field 548 may identify the target carrier frequency to which the base station 102 and user equipments 104, 106 should switch.

Figure 6:
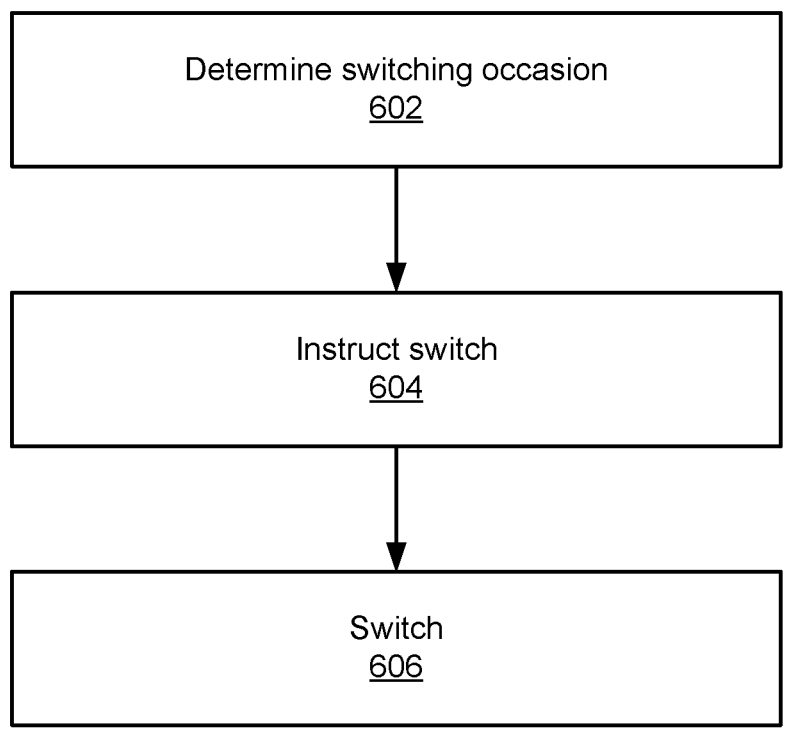
FIG. 6 is a flowchart of a method performed by a base station according to an example implementation.

FIG. 6 is a flowchart of a method performed by the base station 102 according to an example embodiment. The method may include determining, by a base station, a switching occasion during which at least one connected user equipment will be in a connected off cycle and at least one idle user equipment will be in an idle off cycle (602), instructing the at least one connected user equipment and at least one idle user equipment to switch, during the switching occasion, from communicating with the base station via a source carrier frequency to communicating with the base station via a target carrier frequency (604), and switching, during the switching occasion, from communicating with the at least one connected user equipment and the at least one idle user equipment via the source carrier frequency to communicating with the at least one connected user equipment and the at least one idle user equipment via the target carrier frequency.

According to an example, the at least one connected user equipment may not be required to monitor for a control signal during the switching occasion.

According to an example, the at least one idle user equipment may not be required to monitor for a control signal during the switching occasion.

According to an example, the switching occasion may not include a time period during which either the at least one connected user equipment or the at least one idle user equipment is required to monitor for a control signal.

According to an example, the switching occasion may not include a connected on cycle during which the at least one connected user equipment is required to monitor a Physical Downlink Control Channel (PDCCH) or an idle on cycle during which the at least one idle user equipment is required to monitor the PDCCH.

According to an example, the instructing the at least one connected user equipment and the at least one idle user equipment to switch may include sending a switch message to the at least one connected user equipment and the at least one idle user equipment, the switch message identifying the switching occasion and the target carrier frequency.

According to an example, the instructing may include sending a broadcast switch message to the at least one connected user equipment and the at least one idle user equipment.

According to an example, the instructing may include sending a unicast connected switch message to the at least one connected user equipment and a unicast idle switch message to the at least one idle user equipment.

According to an example, the method may further include instructing at least one of the connected user equipment and the idle user equipment to enter the connected off cycle or the idle off cycle during the switching occasion.

According to an example, the determining the switching occasion may be performed in response to receiving an instruction to stop communicating via the source carrier frequency.

According to an example, the determining the switching occasion may be performed in response to receiving, from a Spectrum Access System entity, a message indicating that a higher-priority entity is claiming the source carrier frequency.

According to an example, the determining the switching occasion may be performed in response to receiving, from a Spectrum Access System entity, a heartbeat response message, the heartbeat response message indicating that a higher-priority entity is claiming the source carrier frequency.

According to an example, the switching may be performed during a Discontinuous Reception (DRX) process.

According to an example, the source carrier frequency may be non-overlapping with the target carrier frequency.

According to an example, the switching may include ceasing to communicate with the at least one connected user equipment and the at least one idle user equipment via the source carrier frequency.

According to an example, the switching occasion may be a time period of equal to or less than one millisecond (1 ms).

According to an example, the base station may not have been communicating with either the at least one connected user equipment or the at least one idle user equipment via the target carrier frequency before the switch.

Figure 7:
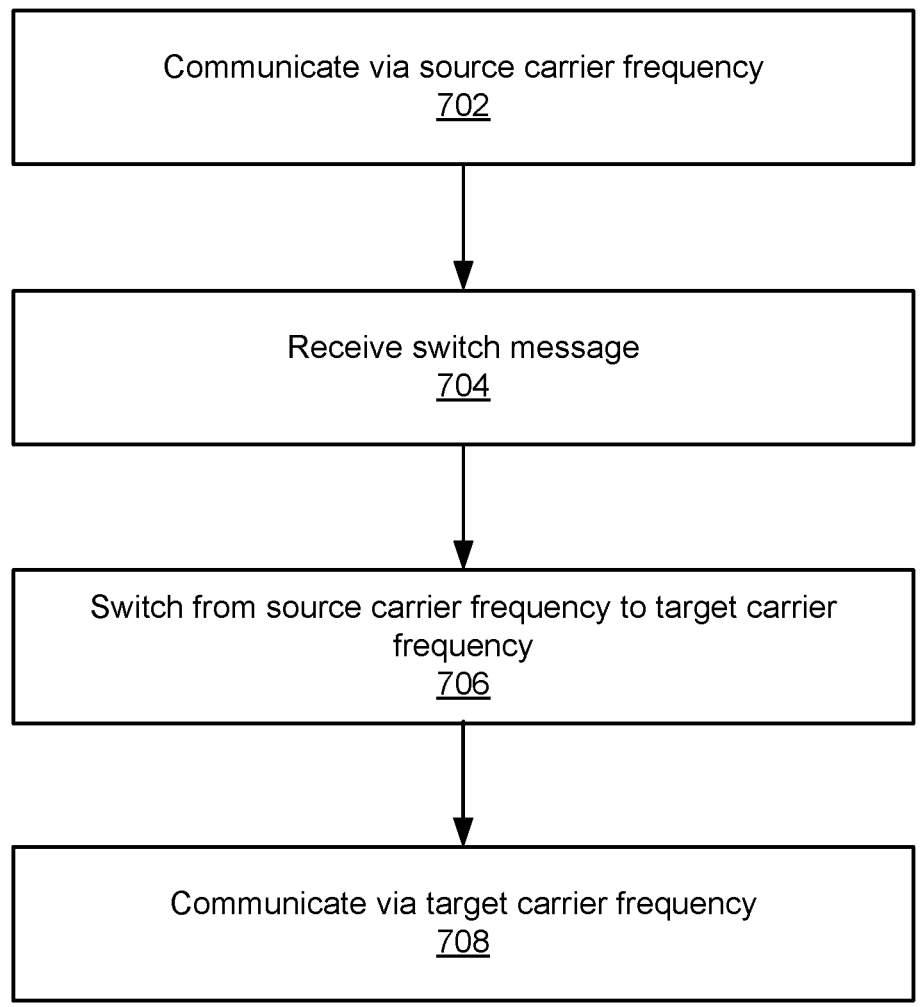
FIG. 7 is a flowchart of a method performed by a user equipment according to an example implementation.

FIG. 7 is a flowchart of a method performed by a user equipment 104, 106 according to an example embodiment. According to this example, the method may include communicating, by a user equipment, with a base station via a source carrier frequency (702), receiving a switch message from the base station, the switch message instructing the user equipment to switch from a source carrier frequency to a target carrier frequency during a switching occasion, the switch message identifying the target carrier frequency and the switching occasion, the switching occasion being a time period when the user equipment and other user equipments served by the base station are not required to monitor for a control signal (704), switching, during the switching occasion, from the source carrier frequency to the target carrier frequency (706), and communicating with the base station via the target carrier frequency (708).

Figure 8:
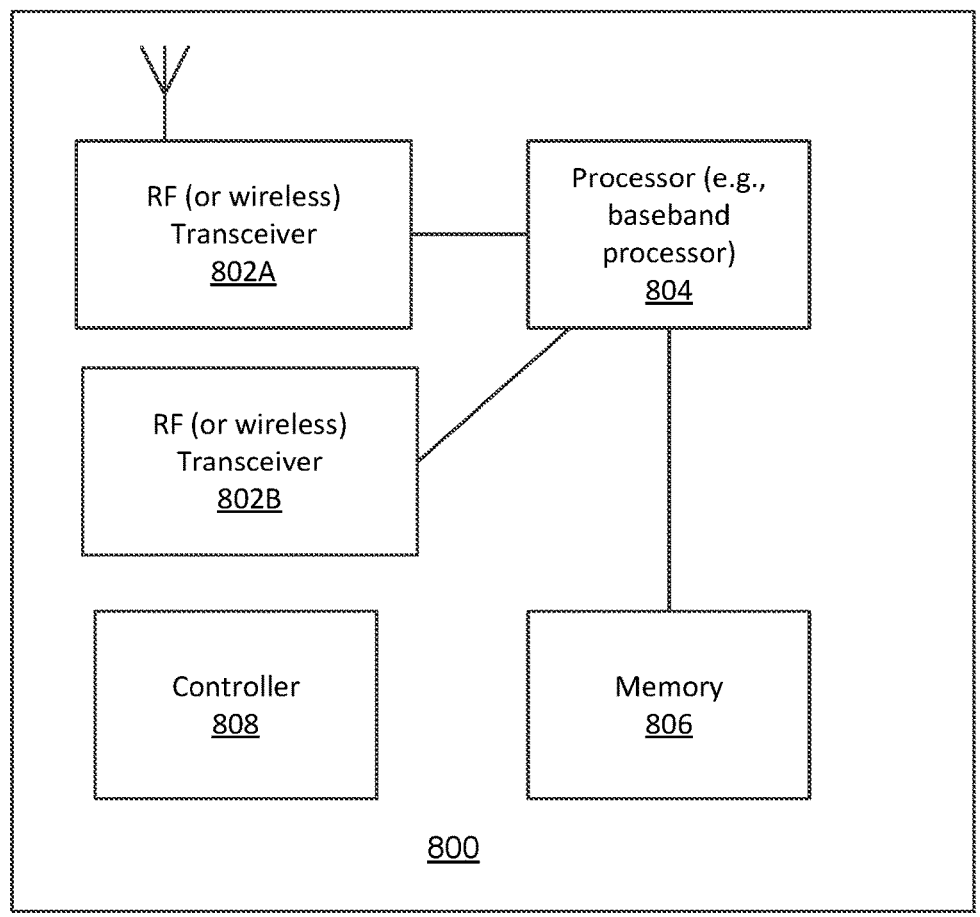
FIG. 8 is a block diagram of a node or wireless station (e.g., network device, base station/access point or mobile station/user device/user equipment), according to an example implementation.

FIG. 8 is a block diagram of a wireless station (e.g., base station 102 or user equipment 104, 106) 800 according to an example implementation. The wireless station 800 may include, for example, one or two RF (radio frequency) or wireless transceivers 802A, 802B, where each wireless transceiver includes a transmitter to transmit signals and a receiver to receive signals. The wireless station 800 also includes a processor or control unit/entity (controller) 804 to execute instructions or software and control transmission and receptions of signals, and a memory 806 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   determining, by a base station, a switching occasion during which at least one connected user equipment will be in inactive and at least one idle user equipment will be inactive, wherein the switching occasion includes a common subframe during which:
   the at least one connected user equipment will be inactive and/or in an off cycle or off duration and the at least one idle user equipment will be inactive and/or in an off cycle; and/or
   all user equipments serviced by the base station will be inactive and/or in off cycles or off durations, the common subframe selected as the switching occasion having an inactive cycle and/or off duration for all of the user equipments;
   instructing the at least one connected user equipment and at least one idle user equipment to switch, during the switching occasion, from communicating with the base station via a source carrier frequency to communicating with the base station via a target carrier frequency; and
   switching, during the switching occasion, from communicating with the at least one connected user equipment and the at least one idle user equipment via the source carrier frequency to communicating with the at least one connected user equipment and the at least one idle user equipment via the target carrier frequency.

2. The method of claim 1, wherein the instructing the at least one connected user equipment and the at least one idle user equipment to switch includes sending a switch message to the at least one connected user equipment and the at least one idle user equipment, the switch message identifying the switching occasion and the target carrier frequency.

3. The method of claim 1, wherein the instructing includes sending a broadcast switch message to the at least one connected user equipment and the at least one idle user equipment.

4. The method of claim 1, wherein the instructing includes sending a unicast connected switch message to the at least one connected user equipment and a unicast idle switch message to the at least one idle user equipment.

5. The method of claim 1, further comprising instructing at least one of the connected user equipment and the idle user equipment to enter the connected off cycle or the idle off cycle during the switching occasion.

6. The method of claim 1, wherein the determining the switching occasion is performed in response to receiving an instruction to stop communicating via the source carrier frequency.

7. The method of claim 1, wherein the determining the switching occasion is performed in response to receiving, from a Spectrum Access System entity, a message indicating that a higher-priority entity is claiming the source carrier frequency.

8. The method of claim 1, wherein the determining the switching occasion is performed in response to receiving, from a Spectrum Access System entity, a heartbeat response message, the heartbeat response message indicating that a higher-priority entity is claiming the source carrier frequency.

9. The method of claim 1, wherein the switching is performed during a Discontinuous Reception (DRX) process.

10. The method of claim 1, wherein the source carrier frequency is non-overlapping with the target carrier frequency.

11. The method of claim 1, wherein the switching includes ceasing to communicate with the at least one connected user equipment and the at least one idle user equipment via the source carrier frequency.

12. The method of claim 1, wherein the switching occasion is a time period of equal to or less than one millisecond (1 ms).

13. The method of claim 1, wherein the base station was not in communication with either the at least one connected user equipment or the at least one idle user equipment via the target carrier frequency before the switch.

14. A method comprising:
    communicating, by a user equipment, with a base station via a source carrier frequency;
    receiving a switch message from the base station, the switch message instructing the user equipment to switch from a source carrier frequency to a target carrier frequency during a switching occasion, the switch message identifying the target carrier frequency and the switching occasion, the switching occasion being a common subframe during which:
    at least one connected user equipment will be inactive and/or in an off cycle or off duration and at least one idle user equipment will be inactive and/or in an off cycle; and/or
    all user equipments served by the base station will be inactive and/or in off cycles or off durations, wherein the common subframe selected as the switching occasion has an inactive cycle and/or off duration for all the user equipments served by the base station;
    switching, during the switching occasion, from the source carrier frequency to the target carrier frequency; and
    communicating with the base station via the target carrier frequency.

15. A non-transitory computer-readable storage medium comprising instructions stored thereon that, when executed by at least one processor, are configured to cause a base station to at least:
    determine a switching occasion during which at least one connected user equipment will be inactive and at least one idle user equipment will be inactive, wherein the switching occasion includes a common subframe during which:
    the at least one connected user equipment will be inactive and/or in an off cycle or off duration and the at least one idle user equipment will be inactive and/or in an off cycle; and/or
    all user equipments served by the base station will be inactive and/or in off cycles or off durations, the common subframe selected as the switching occasion having an inactive cycle and/or off duration for all of the user equipments;
    instruct the at least one connected user equipment and at least one idle user equipment to switch, during the switching occasion, from communicating with the base station via a source carrier frequency to communicating with the base station via a target carrier frequency; and
    switch, during the switching occasion, from communicating with the at least one connected user equipment and the at least one idle user equipment via the source carrier frequency to communicating with the at least one connected user equipment and the at least one idle user equipment via the target carrier frequency.

16. A non-transitory computer-readable storage medium comprising instructions stored thereon that, when executed by at least one processor, are configured to cause a user equipment to at least:
communicate with a base station via a source carrier frequency;
receive a switch message from the base station, the switch message instructing the user equipment to switch from a source carrier frequency to a target carrier frequency during a switching occasion, the switch message identifying the target carrier frequency and the switching occasion, the switching occasion including a common subframe during which:
at least one connected user equipment will be inactive and/or in an off cycle or off duration and at least one user equipment will be inactive and/or in an off cycle; and/or
all user equipments served by the base station will be inactive and/or in off cycles or off durations, the common subframe selected as the switching occasion having an inactive cycle and/or off duration for all of the user equipments served by the base station;
switch, during the switching occasion, from the source carrier frequency to the target carrier frequency; and
communicate with the base station via the target carrier frequency.

17. A base station comprising:
at least one processor; and
a memory comprising instructions stored thereon that, when executed by at least one processor, are configured to cause the base station to at least:
determine a switching occasion during which at least one connected user equipment will be in a connected off cycle and at least one idle user equipment will be in an idle off cycle, wherein the switching occasion includes a common subframe during which:
at least one connected user equipment will be inactive and/or in an off cycle or off duration and at least one idle user equipment will be inactive and/or in an off cycle; and/or
all user equipments served by the base station will be inactive and/or in off cycles or off durations, the common subframe selected as the switching occasion having an inactive cycle and/or off duration for all of the user equipments;
instruct the at least one connected user equipment and at least one idle user equipment to switch, during the switching occasion, from communicating with the base station via a source carrier frequency to communicating with the base station via a target carrier frequency; and
switch, during the switching occasion, from communicating with the at least one connected user equipment and the at least one idle user equipment via the source carrier frequency to communicating with the at least one connected user equipment and the at least one idle user equipment via the target carrier frequency.

18. A user equipment comprising:
at least one processor; and
a memory comprising instructions stored thereon that, when executed by at least one processor, are configured to cause the user equipment to at least:
communicate with a base station via a source carrier frequency;
receive a switch message from the base station, the switch message instructing the user equipment to switch from a source carrier frequency to a target carrier frequency during a switching occasion, the switch message identifying the target carrier frequency and the switching occasion, the switching occasion being a time period when the user equipment and other user equipments served by the base station are not required to monitor for a control signal, wherein the switching occasion includes a common subframe during which:
at least one connected user equipment will be inactive and/or in an off cycle or off duration and at least one idle user equipment will be inactive and/or in an off cycle; and/or
all user equipments served by the base station will be inactive and/or in off cycles or off durations, the common subframe selected as the switching occasion having an inactive cycle and/or off duration for all of the user equipments served by the base station;
switch, during the switching occasion, from the source carrier frequency to the target carrier frequency; and
communicate with the base station via the target carrier frequency.

* * * * *